United States Patent [19]

Specht et al.

[11] 4,072,218
[45] Feb. 7, 1978

[54] SPINDLE BRAKE MECHANISM FOR MILLING MACHINES

[75] Inventors: Thomas F. Specht, Arlington Heights; Juergen W. Trodler, Chicago; Pavel Vanecek, Lyons, all of Ill.

[73] Assignee: Union Special Corporation, Chicago, Ill.

[21] Appl. No.: 748,424

[22] Filed: Dec. 8, 1976

[51] Int. Cl.² .................................... F16D 49/00
[52] U.S. Cl. ............................. 188/75; 188/264 D
[58] Field of Search ................ 188/75, 74, 67, 28, 188/106 F, 156, 158, 58, 59, 171, 264 D; 192/93 R, 1, 2, 79, 139

[56] References Cited

U.S. PATENT DOCUMENTS

| | | | |
|---|---|---|---|
| 1,895,996 | 1/1933 | Jones | 188/75 |
| 2,174,398 | 9/1939 | Farmer | 188/59 |
| 3,338,340 | 8/1967 | Oesterreicher | 188/75 |
| 3,756,354 | 9/1973 | Clark | 188/75 X |
| 3,916,721 | 11/1975 | Egger | 188/75 X |

FOREIGN PATENT DOCUMENTS 1,216,880  11/1959  France ................... 188/75

Primary Examiner—Trygve M. Blix
Assistant Examiner—Douglas C. Butler
Attorney, Agent, or Firm—John W. Harbst; John A. Schaerli

[57] ABSTRACT

A spindle brake mechanism for a milling machine which includes a plurality of brake shoes that are pivotally mounted about the machine spindle. The brake shoes are pivoted for movement into and out of frictional braking contact with the machine spindle and are circumferentially encompassed by a freely rotatable ring which carries thereon a plurality of actuating members that associate with each of the brake shoes. At the completion of the work cycle, the driving force is removed from the spindle and the ring is rotated thus causing the actuating members to forcibly cam the brake shoes into contact with the spindle thus applying a frictional braking effect thereon.

4 Claims, 6 Drawing Figures

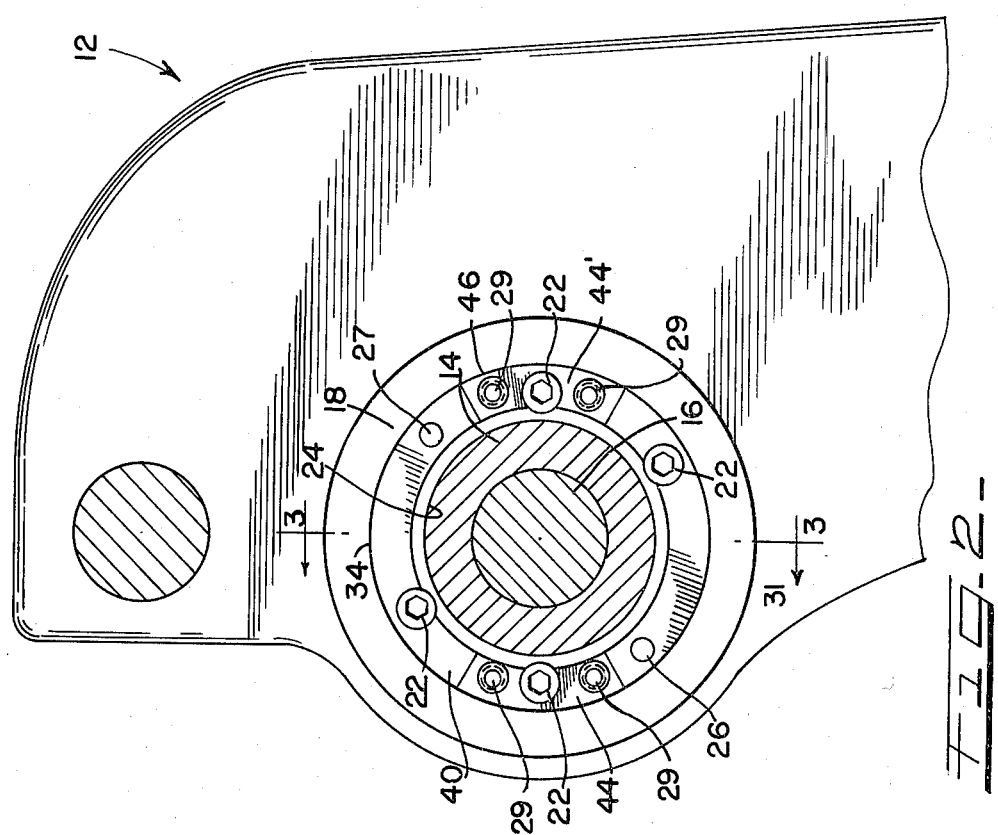
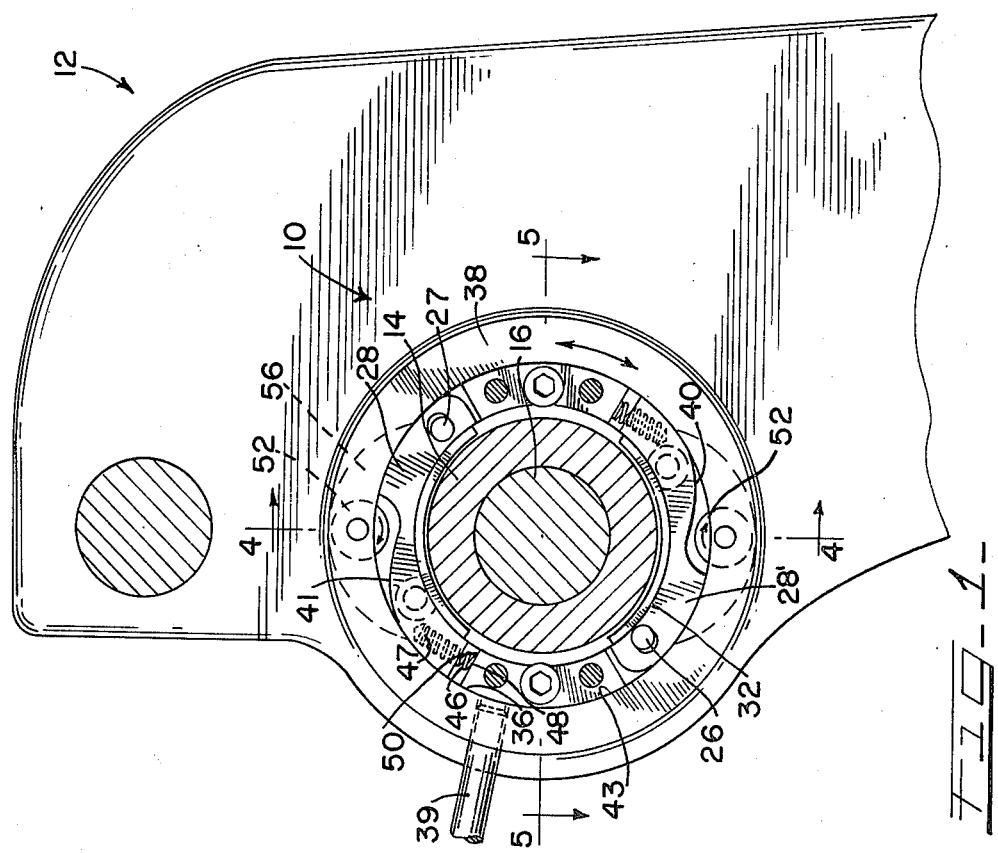

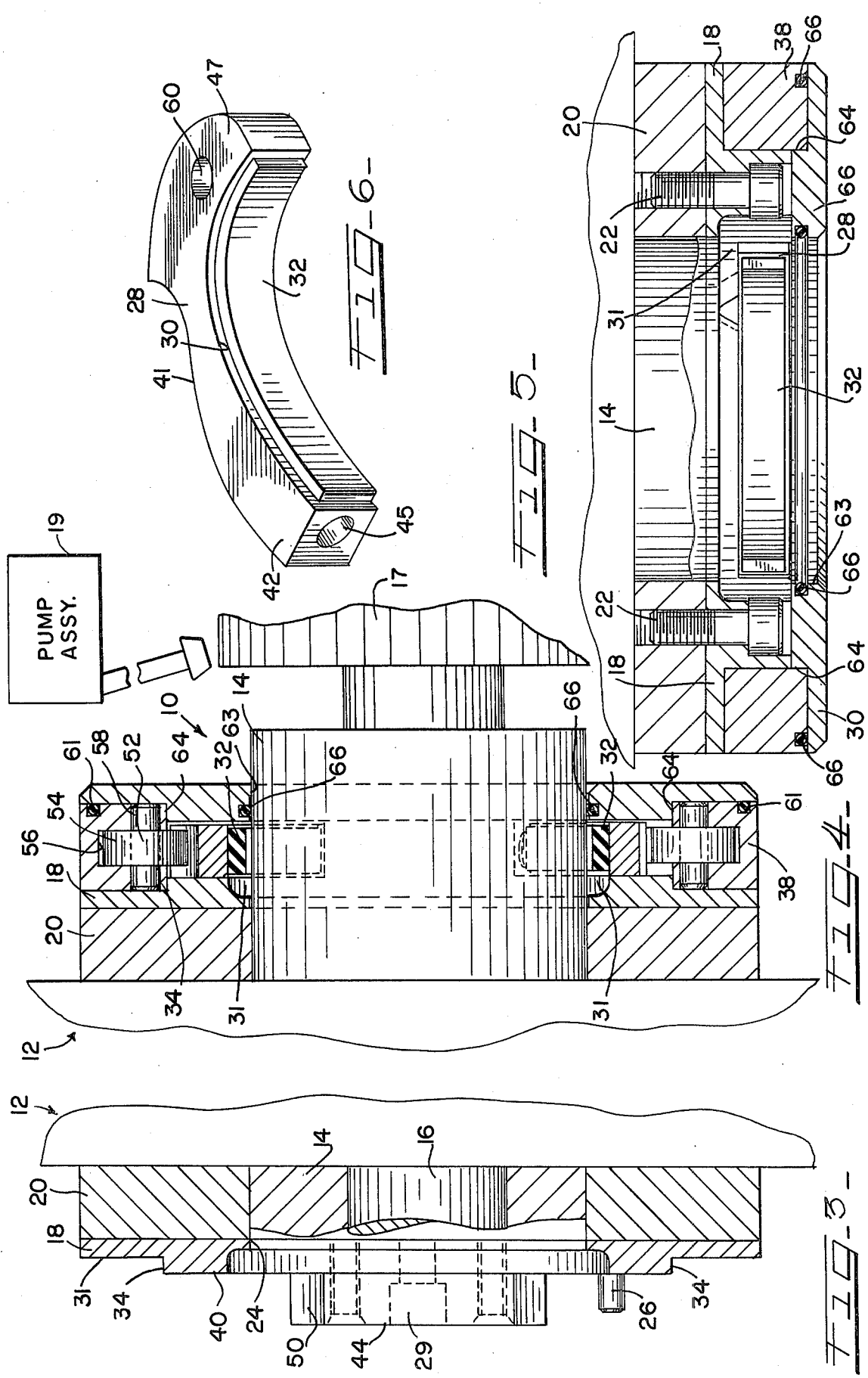

SPINDLE BRAKE MECHANISM FOR MILLING MACHINES

This invention relates in general to milling machines and more particularly to a spindle brake mechanism therefor.

BACKGROUND OF THE INVENTION

Milling machines are made in a variety of types and sizes. The drive mechanism for some is of the type wherein a motor drives a large diameter pulley which is employed to forcibly rotate a tool while others employ smaller diameter pulleys which can be either motor driven or gear driven. With the present invention we are concerned with milling machines employing small diameter pulleys. These smaller diameter pulley machines, in general, provide for a greater range of spindle speeds. The duration for which the rotating tool is actually working on the work piece is relatively short, that is, at times it falls within the 15 to 25 seconds range. In most cases, it is desirous, for safety reasons, if the operator waits until the tool has completely stopped rotating before inserting his hand under the tool for removing the work piece and inserting another. It has been found, that when using the smaller diameter pulleys it takes approximately 20 seconds for the driven pulley to come to a complete stop after de-energization of the motor. This effect is caused by the inertia inherent within the rotating bodies. Because of the short work cycle, it is a drawback for the operator having to wait for the drive pulley to coast to a stop before inserting his hand under the tool. In some cases, manufacturers have designed brakes for the motor whereby braking the drive shaft of the motor after de-energization of the same. However, with devices of this sort, the operator is usually limited as to the number of start/stop operations they can employ per minute. On the short working cycle operations this can prove to be a definite drawback due to the turnover of the work pieces desired.

SUMMARY OF THE INVENTION

In view of the above, and in accordance with the present invention, there is provided a spindle brake mechanism for a milling machine which applies a frictional braking effect upon the machine spindle once the driving force has been removed therefrom. The spindle brake mechanism provides the means for overcoming the inertia forces of the rotating drive assembly and stops the same immediately after de-energization of the drive mechanism. The spindle brake mechanism of the present invention includes a plurality of brake shoes which are pivotally mounted about the machine spindle. These brake shoes are pivoted for movement into and out of frictional braking contact with the machine spindle and are circumferentially encompassed by a freely rotatable ring which carries thereon a plurality of actuating members that associate with each of the brake shoes. Once the driving force delivered to the spindle is removed the ring is oscillated whereby forcibly moving the actuating members into a chamming relationship with the brake shoes. This camming relationship drives the brake shoes into frictional contact with the spindle thus applying a braking effect thereupon. By applying a frictional fraking force to the machine spindle, it is possible to overcome the inertia forces of the rotating bodies and stop both the driven pulley and the drive pulley immediately after de-energization of the motor.

Broadly stated it is an object of this invention to provide a spindle brake mechanism for a milling machine which will apply a braking effect upon the driven spindle once the driving force has been removed therefrom.

A further object of this invention is to provide a spindle brake mechanism which is easily installed.

Another object of this invention is to provide a spindle brake mechanism which is either manually or automatically operated.

It is yet another object of this invention to provide a spindle brake mechanism which can be operated without time limits thereon.

In the accompanying drawings annexed hereto and forming part of this specification, the present invention is shown embodied in a motor driven, manually operated, horizontal type milling machine, but it will be understood that some of the features of the invention can be embodied in other machine tools and that the drawings are not to be construed as defining or limiting the scope of the invention, the claims appended to this specification being relied upon for that purpose.

In the drawings:

FIG. 1 is a front elevational view showing the spindle brake mechanism as mounted to the milling machine with the front plate removed.

FIG. 2 is a front elevational view showing the base plate of the present invention mounted to the front of the milling machine.

FIG. 3 is a partial end sectional view showing the base plate mounted to the machine as shown along line 3—3 of FIG. 2.

FIG. 4 is a partial end sectional view taken along line 4—4 of FIG. 1.

FIG. 5 is a top sectional view taken along line 5—5 of FIG. 1.

FIG. 6 is a prospective view of the brake shoe employed with the present invention.

In the above mentioned drawings there has been shown but one embodiment of the invention which is now deemed preferable, but it is to be understood that changes and modifications may be made within the scope of the appended claims without departing from the spirit of the invention.

DESCRIPTION OF THE PREFERRED EMBODIMENT

In the practical development of the invention as shown in FIGS. 1 through 6, the spindle brake mechanism assembly means 10 is secured to a standard Nichols hand milling machine 12 which may be of the type shown in U.S. Pat. No. 2,083,858 to W. H. Nichols granted June 15, 1937, the teachings of which are incorporated herein by reference. The hand milling machine 12 is provided with a cutter spindle means 14 which is appropriately journaled for rotation within the milling machine. Secured within the spindle and driven thereby is a horizontal arbor means 16 which is provided for holding a rotatable cutting tool 17. The spindle means 14 is driven by motor means (not shown) for forcibly rotating the tool 17. In association with the milling machine 12 is a pump assembly generally indicated in FIG. 4 as 19. The pump assembly may be of the type shown in U.S. Pat. No. 2,143,032 to E. J. Ruthman granted Jan. 10, 1939, the teachings of which are incorporated herein by reference. The pump assembly is provided to circulate, in the usual manner, a cooling medium relative to the machine tool 17.

As may be best seen in FIGS. 1, 2 and 3 the spindle brake assembly means 10 is provided with a base plate means 18 which serves to fasten the spindle brake assembly 10 to an upstruct member 20 on the machine 12. The base plate means 18 is fastened to the upstruct member by a plurality of bolt means 22. The base plate member means is provided with an aperture means 24 which has an inside diameter measurement equal to outside diameter measurement of the spindle 14, that is, the mounting plate means 18 completely encompasses the spindle means 14. There is provided on the base plate means two upstanding pin means 26 and 27. The pin means 26 and 27 serve as pivot points for the brake shoe means 28 and 28' (FIG. 1) as will hereinafter be described. Further included on the base plate member means 18 is a plurality of threaded apertures 29 which are employed for securely fastening the front plate means 30 (FIG. 5) to the base plate means 18 by any suitable means. The base plate means 18 is formed with a plurality of circular upstruct or stepped members 31, 40, 44 and 44'. It should be appreciated that these upstruct members are concentric with the major axis of the spindle means 14. The upstruct circular member 40 has an outside diameter 34 equal in measurement to the inside diameter 36 of a freely rotatable ring means 38 and serves as a bearing surface therefore. The base plate 18 is further provided with two other upstruct members 44 and 44' which have an outside diameter 46 that is congruent with the outside diameter measurement 34 of the lower upstruct member means 40. In this manner the outside diameter 46 of the second upstruct members 44 and 44' also serve as a bearing surface for the freely rotatable ring means 38.

Turning now to FIGS. 1, 4 and 6 it may be seen that there are a plurality of shoe means namely 28 and 28' which are pivoted about the pin means 26 and 27. The shoe means 28 and 28' are identical and thus only shoe means 28 will be described in detail. The shoe means 28 has secured to its undersurface 30 a frictional braking pad means 32 which is movable into and out of frictional braking contact with the spindle 14 of the machine. The brake shoe means 28 is provided on the side opposite the spindle with a camming surface means 41, the purpose of which will be described hereinafter. The brake shoe means 28 has provided at its first end means 42 an aperture means 45. The aperture means 45 is provided for housing a compression spring means 46. The first end means 47 of the spring means 46 bottoms out at the bottom side of the aperture means 45 while the second end means 48 of the spring means 46 pushes against the surface 50 of the upstanding circular member means 44 on the base member means 18. In this manner the brake shoe means 28 and the frictional engaging pad means 32 is constantly urged away from the spindle means 16. As was mentioned earlier, the shoe means 28 is pivoted about the pivot means 26. The brake shoe means 28 has provided at its second end means 43 an elongated slot means 60 which fits around the pin means 26. The purpose of the slot means 60 allows the entire surface of the pad means 32 also to come in contact with the spindle means 16 thus allowing the maximum frictional braking contact with the spindle means 16.

The brake shoe means 28 and 28' are encompassed by a freely rotating ring means 38. The ring means 38 serves a plurality of purposes, one of which is to limit the movement of the shoe means 28 and 28' away from the spindle means 14. This is accomplished by providing that the shoe means 28 and 28' are positioned within the inside diameter 36 of the ring means 38. Threadably engaged with the ring means 38 is a handle means 39, the purpose of which will be described hereinafter. Rotatably carried by the ring means 38 are a plurality of actuating members 52. As is apparent from FIG. 4 the actuating members include a roller means 54 which is freely rotatable within a cutout 56 on the ring means 38. The roller means 54 is mounted for rotation on a pin means 58 which is securely held by the ring means 38. The ring means 38 is further provided with a sealing means 61 which prevents any of the machine coolant from leaking into the brake assembly means 10.

As was discussed earlier, and as best viewed in FIGS. 4 and 5, secured to the base plate means 18 is a front plate means 30. The front plate means 30 has an aperture means 63 which has an inside diameter slightly larger than the outside diameter of the spindle means 14, thus allowing passage of the spindle means therethrough. The top plate means 30 has formed thereon a step means 64 which serves as a bearing surface for the inside diameter of the ring means 38. It is to be noted that the arrangement of base plate means 18, top plate means 30 and ring means 38 rotatably secured therebetween, forms a chamber means 31. It is within this chamber means that the brake shoes 28 and 28' are situated. The top plate means 30 is provided with a sealing means 66 which is in operative association with the spindle means 14 (FIG. 4) for maintaining the machine coolant from entering the chamber means 31.

OPERATION OF THE DEVICE

During the operation of the machine the brake shoe means 28 and 28' are held away from the spindle means 14 under the influence of the spring means 46. If it is desired to stop the tool from rotating, the operator de-energizes the motor whereby the driving force is removed from the spindle means 14. The operator then rotates the ring means 38 by moving the handle means 39 in a counterclockwise direction. Due to rotation of the ring means 38 the actuating members 52 are forced into a camming relationship with the camming surface 41 of the shoe means 28. Continued rotation of the ring means 38 will forcibly overcome the opposing force supplied by the spring means and cause the frictional braking element 32 to be forced into braking contact with the outside diameter of the spindle means 14 whereby immediately stopping the spindle from continued rotation. The elongated slot means 60 formed in the brake shoe means 28 allows the entire friction pad surface 32 to frictionally engage the outside diameter of the spindle means 14. As was described earlier, the spindle means 14 drives the arbor means 16 on which the tool is affixed. By preventing continued rotation of the spindle means 16 the rotating tool is stopped whereby allowing safe access to the work piece.

Rather than manually actuate the handle means 39 it is well within the scope of this invention to provide an actuation means for the handle means 39. In a device of this sort, the actuation means is connected to the operator switch controlled means of the machine. In this manner, once the operator de-energizes the motor, a signal is delivered to the actuation means for forcibly rotating the handle and the ring means in a direction so that the actuating members 52 would forcibly cam the braking element against the spindle means 14.

Thus it should be apparent that there has been provided a spindle brake mechanism which comes into a frictional braking relationship with the spindle means of the machine at the completion of the work cycle. By braking the spindle means of the machine and thus preventing continued rotation of the cutting tool, the operator may gain immediate access to the work area as soon as he has completed the cutting operation on that particular work piece. This spindle brake assembly allows the operator quicker access to the working area rather than waiting for the machine spindle to coast to a stop as been heretofore known. As may be appreciated, quicker access to the work area greatly reduces the work cycle and thus may, in some instances, increase production. By the provision of the spindle brake mechanism the safety factor associated with the job is also greatly enhanced.

Thus it is apparent that there have been provided, in accordance with the invention, a Spindle Brake Mechanism for Milling Machine that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives and broad scope of the appended claims.

What is claimed is:

1. A brake mechanism for a milling machine having a rotating spindle means, a tool carried on said spindle means, and means for cooling said tool, said brake mechanism comprising:
   a shiftable ring means;
   a base plate means secured to said machine on one side of said shiftable ring means;
   a top plate means including means for securing said top plate means to said base plate means on the other side of said shiftable ring means whereby forming a chamber means;
   sealing means carried by said top plate means for association with said rotating spindle means for maintaining said coolant means out of said chamber means;
   at least one brake shoe means disposed within said chamber means and being adapted to radially move into and out of contact with said rotating spindle means, said brake shoe means including a camming surface means thereon;
   roller means carried by said shiftable ring means for association with said camming surface means; and
   operator controlled means operatively connected to said ring means for moving said roller means into engagement with said camming surface means whereby forcibly moving said brake shoe means into contact with said rotating spindle means.

2. A brake mechanism according to claim 1 further including biasing means for moving said brake shoe means away from said rotating spindle means.

3. A brake mechanism according to claim 2 wherein said shiftable ring means coaxially encompasses said brake shoe means and limits the movement of said brake shoe means away from said rotating spindle means.

4. A brake mechanism according to claim 1 wherein said brake shoe means includes means defining a slot means, said slot means being adapted to move the entire braking surface on said brake shoe means against said rotating spindle means.

* * * * *